Figures 1, 2:
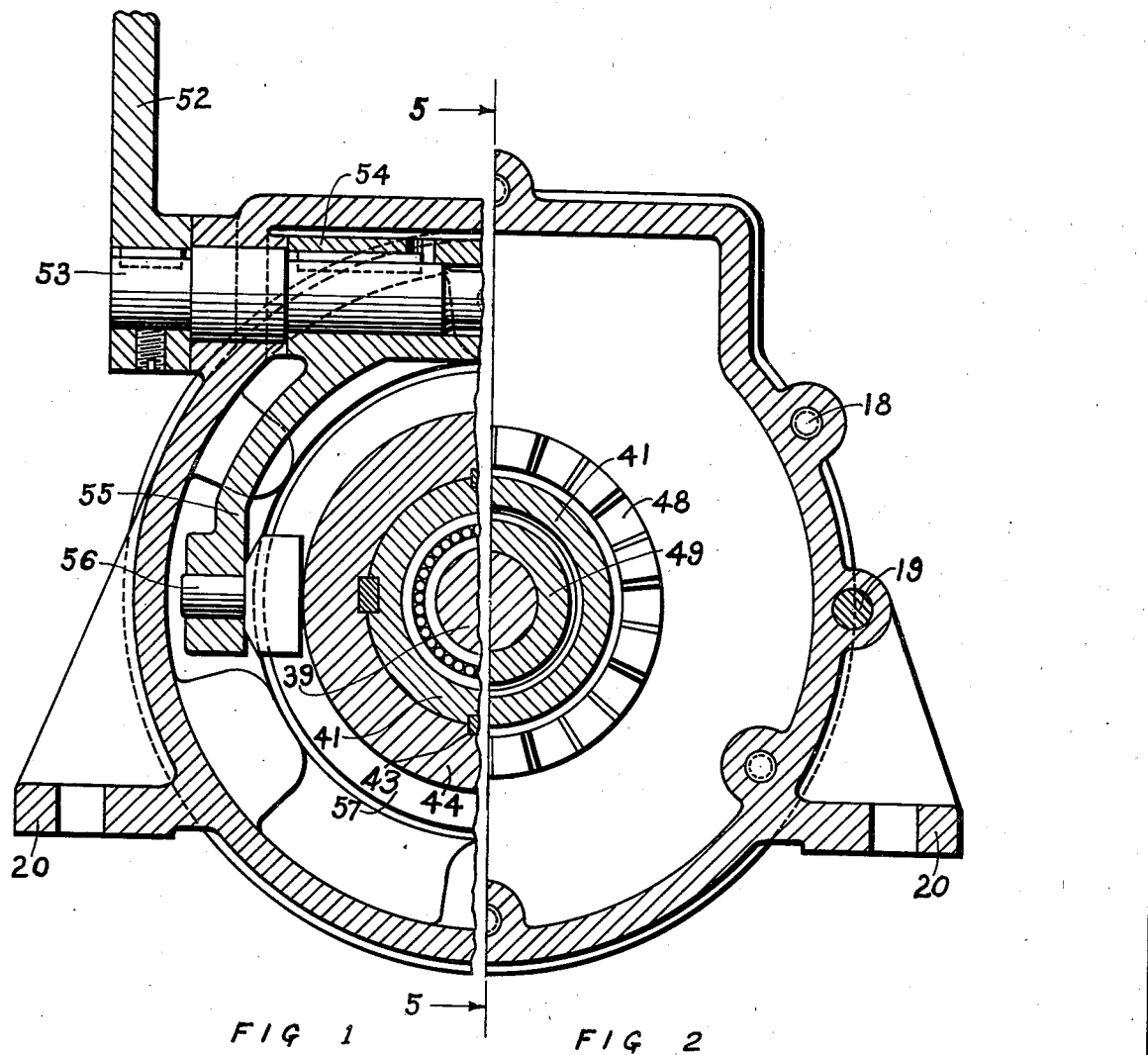

Aug. 6, 1940.  W. H. JOHNSON  2,209,980
REVERSING MECHANISM
Filed Feb. 16, 1938  4 Sheets-Sheet 2

INVENTOR
William H. Johnson
BY
Albert M. Austin
ATTORNEY

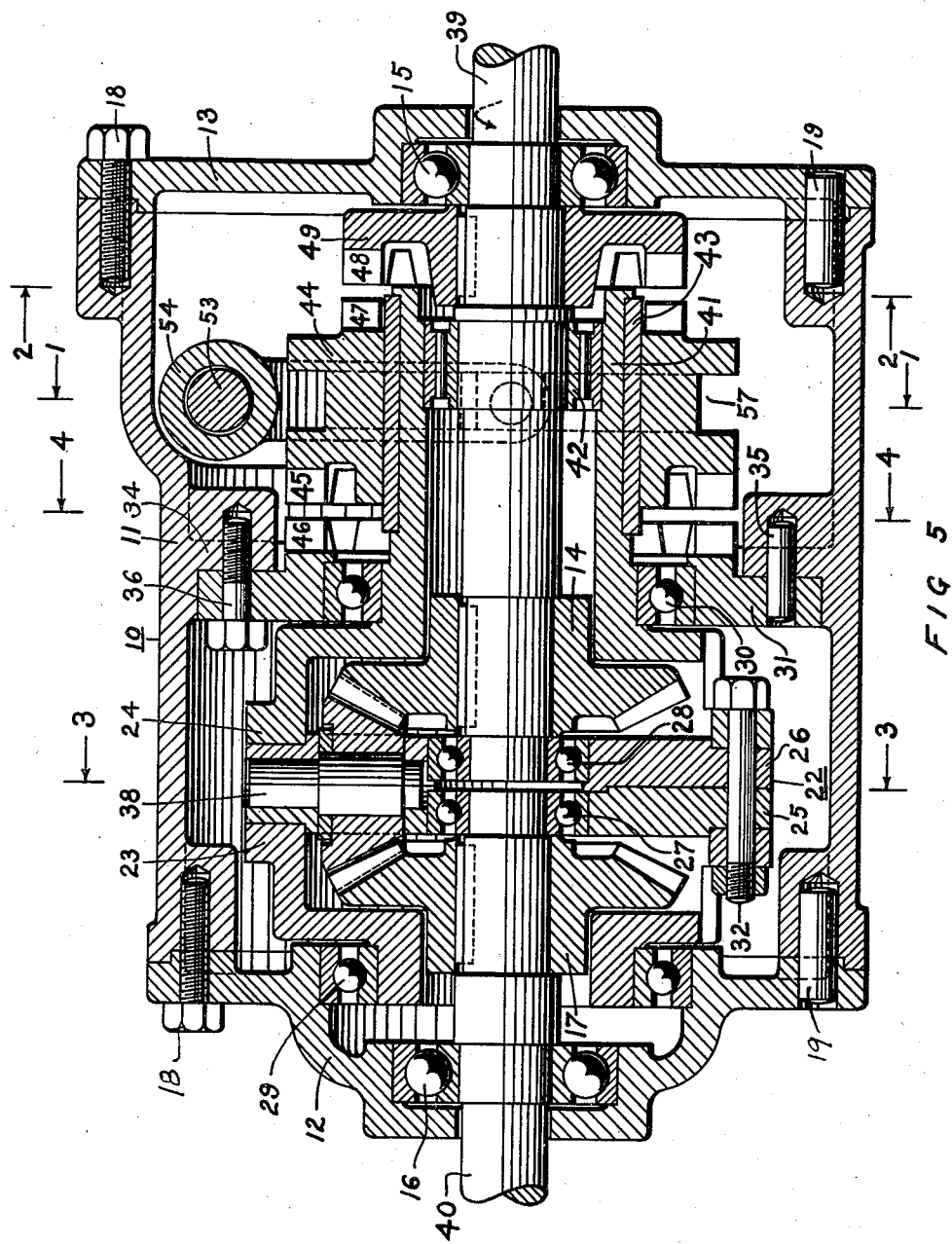

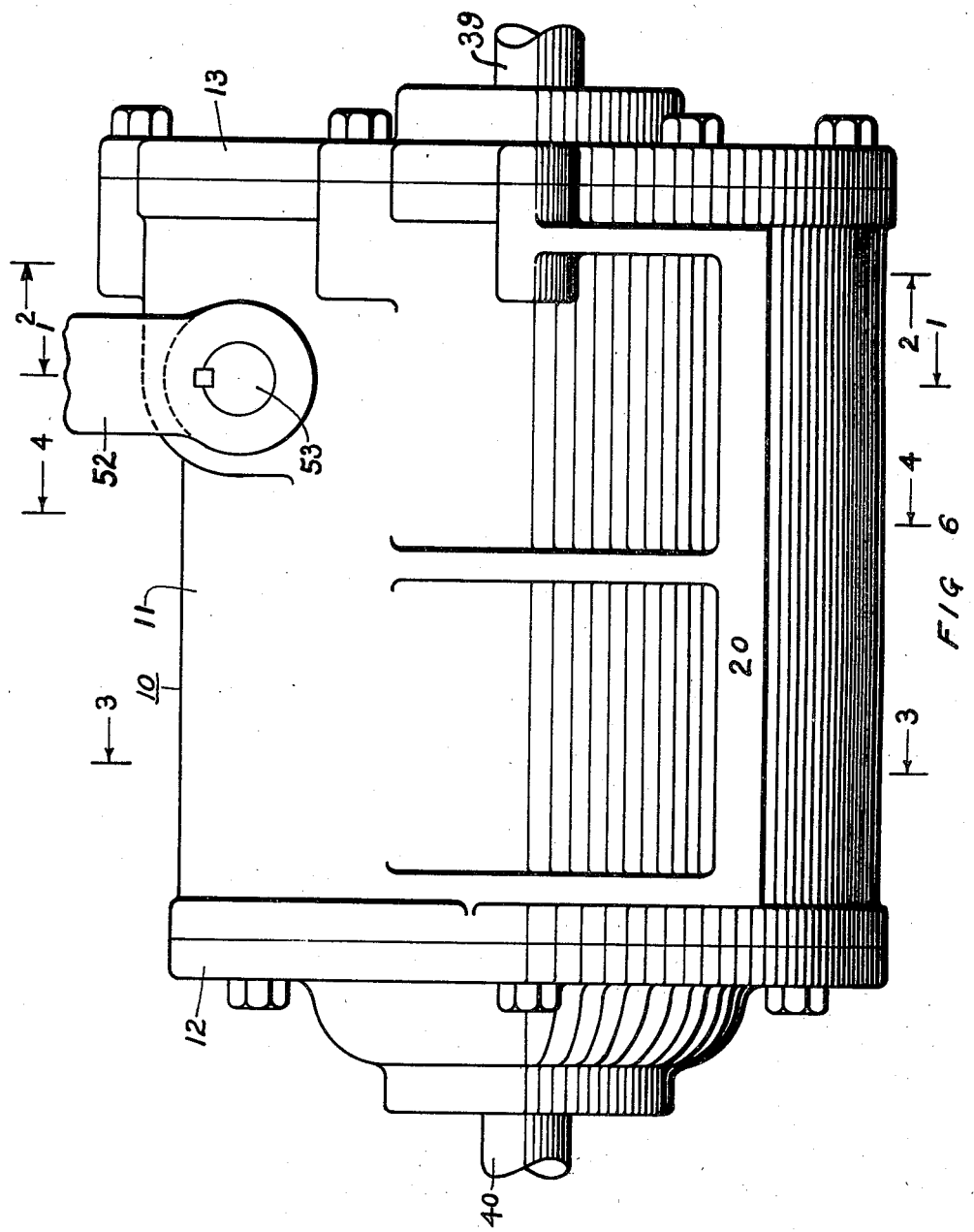

Patented Aug. 6, 1940

2,209,980

UNITED STATES PATENT OFFICE 2,209,980

REVERSING MECHANISM

William Horace Johnson, Cranston, R. I., assignor to Weskenson Corporation, Providence, R. I., a corporation of Rhode Island Application February 16, 1938, Serial No. 190,733

9 Claims. (Cl. 74—297)

The invention relates to a mechanical transmission and, more particularly, to a transmission for quickly changing between forward and reverse speeds.

According to a preferred form of the invention, the operating parts are contained in a suitable casing. A differential, comprising the usual housing, side gears and pinion gears, connects the driving and driven shafts, these shafts being connected, respectively, to the side gears of the differential. The housing of the differential has an extension sleeve on which a clutch collar slides. The casing has a stationary brake plate and the drive shaft has a rotating clutch plate adapted to be engaged, respectively, by the clutch collar. Suitable clutch surfaces may be provided between the clutch collar and the clutch and brake plates which may be, for example, in the form of dog teeth. A suitable operating lever may be provided for sliding the clutch collar for forward and reverse operation.

The transmission may be adapted for use wherever quick change between forward and reverse is desired, such, as for example, in motor boats and launches. In case the driven shaft does not have sufficient drag to slow down sufficiently when the clutch collar is operated, special drag devices may be provided for decelerating the driven shaft during the shifting operation. In case speed reduction is desired between driving and driven shafts, a standard gear reduction set may be incorporated as part of the transmission.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Figs. 1-4, inclusive, are transverse sections taken through the transmission on the lines 1—1, 2—2, 3—3 and 4—4, respectively, of Figs. 5 and 6;

Fig. 5 is a longitudinal section through the transmission taken on the lines 5—5 of Figs. 1-4; and Fig. 6 is a side elevation of the transmission.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and, more particularly, to Figs. 5 and 6, the operating parts are enclosed within a casing 10 made up of a body 11 and detachable heads 12 and 13. The heads 12 and 13 are suitably seated within seats in the body 11 and attached thereto by a series of pins 19 and a series of bolts 18. The pins are used for the purpose of lining up the heads 12 and 13 with the body 11 and the bolts 18 securely clamp the heads in position.

The casing 10 may be filled to the proper level with suitable lubricant so that all the parts may run in oil. The sides of the body 11 may be provided with supporting flanges 20 through which suitable holddown bolts (not shown) may pass for the purpose of supporting the transmission in the frame of the motor boat or launch, or other devices with which the transmission is used.

The drive shaft is denoted by 39 and will be attached to a suitable prime mover, such as an internal combustion engine (not shown). The driven shaft is denoted by 40 and will be attached to the load which may be a propeller shaft (not shown) of a boat. The drive shaft 39 is journalled in a ball bearing assembly 15 seated in head 13. The driven shaft 40 is journalled in a ball bearing assembly 16 seated in head 12. Drive shaft 39 is keyed to bevel gear 14 and driven shaft 40 is keyed to bevel gear 17, these bevel gears forming part of a differential.

Figures 3, 4:
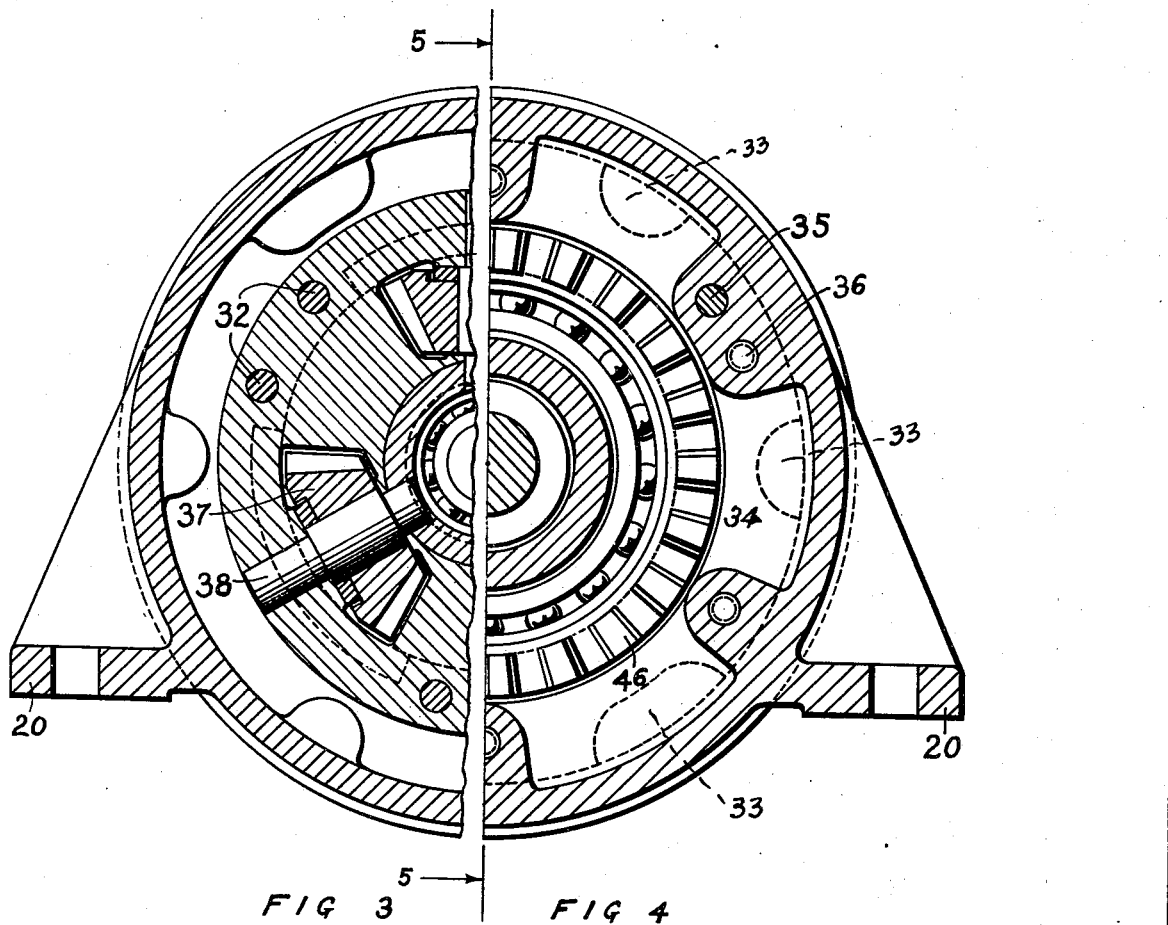

The differential comprises a housing 22 made up of spiders 23 and 24, plates 25 and 26, all of which are suitably seated together and clamped by nut and bolt assemblies 32 (Fig. 3).

Spider 23 is journalled in ball bearing assembly 29 seated in head 12. Spider 24 is journalled in ball bearing assembly 30 seated in a plate 31. Plate 31 is secured to ring 34 on body 11 by pins 35 and bolts 36 (Fig. 4). Ball bearing assemblies 27 and 28 are also provided between the differential plates 25 and 26 and shafts 40 and 39. The edge of plate 31 is recessed as indicated by 33 (Fig. 4) to clear the lugs for supporting bolts 18 and pins 19 for head 12 when plate 31 is assembled into the body 11.

Differential plates 25 and 26 have a series of recesses (Fig. 3) for the differential pinions 37 which mesh the side gears 14 and 17. The pinions 37 are journalled on short shafts 38 suitably clamped between seats in the differential plates 25 and 26.

The clutch construction provides an extension sleeve 41 on spider 24. A roller bearing 42 is provided between sleeve 41 and drive shaft 39. Slidably mounted on sleeve 41 is a clutch collar 44, a series of keys 43 (Fig. 1) being provided to permit axial movement of the clutch collar 44 on sleeve 41, but no relative rotary movement between these parts.

The clutch collar 44 is provided with a set of dog teeth 45 adapted to engage complementary teeth 46 (Fig. 4) on the stationary brake plate 31. The clutch collar 44 is provided with a second set of dog teeth 47 adapted to engage complementary dog teeth 48 (Fig. 2) on clutch collar 49 keyed to drive shaft 39. Thus by axially shifting clutch collar 44, the stationary brake plate 31 and the rotary clutch plate 49 may be selectively engaged.

For operating the clutch, the operating lever 52 (Figs. 1 and 6) is provided. This operating lever will extend to a position convenient for the operator of the vehicle. The operating lever 52 is keyed to shaft 53 journalled in body 11. Shaft 53 has keyed thereto a hub 54 supporting a pair of arms 55. The arms 55 carry swiveled shoes 56 working in a groove 57 on clutch collar 44. Clockwise movement of clutch lever 52 and shaft 53 (Figs. 5 and 6) causes teeth 45 and 46 to engage for reverse. Counter-clockwise movement of lever 52 and shaft 53 in Figs. 5 and 6 causes teeth 47 and 48 to engage for forward speed.

Suitable devices (not shown) will be provided for holding the operating lever 52 in any one of the three selected positions: forward, neutral or reverse. As these devices are old and well known, they are omitted in this disclosure for the sake of clearness.

The operation of the transmission is as follows: In Fig. 5, the transmission is in neutral, i. e. no power is being transmitted from the drive shaft 39 to the driven shaft 40. If the driven shaft be assumed to be stationary and the drive shaft 39 be assumed to be rotating in the direction of the arrow in Fig. 5, the differential housing 22 will rotate idly in the same direction as the drive shaft 39, but at a less angular velocity. To go forward, the clutch collar 44 is moved to the right in Fig. 5, causing teeth 47 and 48 to engage. This locks the differential housing 22 of the drive shaft 39 and the entire differential, drive shaft and driven shaft will rotate as a unit with the driven shaft 40 rotating in the same direction and at the same speed as drive shaft 39. It will be noted that there is no relative movement between the differential parts.

For reverse, the clutch collar 44 is shifted to the left in Fig. 5, causing teeth 45 and 46 to engage. This locks differential housing 22 on the casing, making it stationary. In this case, rotation of drive shaft 39 drives side gear 14, which in turn drives the pinions 37, which in turn drives side gear 17 and driven shaft 40. Driven shaft 40 rotates at the same speed as drive shaft 39, but in the opposite direction.

The present transmission is especially adapted for quick shifting between forward and reverse and does not require a friction clutch for removing the torque from the operating parts while they engage and disengage. Assuming the teeth 47 and 48 to be engaged for forward operation, to reverse, the speed of the prime mover may be decreased, slowing down the drive shaft 39. The shaft lever 52 is operated, disengaging teeth 47 and 48 and immediately engaging teeth 45 and 46 for reverse. While the transmission is in forward speed, the clutch collar 44 is rotating at the same speed as drive shaft 39. As teeth 47 and 48 are disengaged, the instant clutch collar 44 is in neutral, it slows down, so that, when teeth 45 and 46 engage, the collar 44 is rotating at a reduced speed so that this collar engages the stationary brake plate 31 without clashing.

The shifting operation is assisted by slowing down both the drive shaft 39 and driven shaft 40 just before and during shifting, although this is not always necessary. The engine throttle may be closed just before shifting to slow down the drive shaft 39, thus also slowing down driven shaft 40.

The shifting from reverse to forward may be accomplished with similar ease. While the teeth 45 and 46 are engaged, the clutch collar 44 is stationary. As the teeth 45 and 46 disengage, and while the clutch collar 44 is in neutral, it assumes a speed in the same direction as drive shaft 39, so that, when teeth 47 and 48 engage, the clutch collar 44 is already rotating in the same direction as clutch plate 49.

Thus, a transmission has been provided which is rugged in construction, efficient in operation and easy to manipulate. The dog tooth clutch has tapered teeth which enable these teeth to find proper engagement without clashing. The parts are so designed that the clutch dog teeth have minimum relative velocities as they engage. There are no gears to be shifted and there is no friction clutch with its attendant slipping.

While certain novel features of the invention have been disclosed and are pointed out in the annexed claims, it will be understood that various omissions, substitutions and changes may be made by those skilled in the art without departing from the spirit of the invention.

What is claimed is:

1. In a mechanical transmission, a casing having therein a first shaft and a second shaft, one of said shafts being a drive shaft and the other a driven shaft, a differential comprising a housing, pinion gears and side gears, one of said side gears being attached to said first shaft, the other side gear being attached to said second shaft, a bearing between said housing and said casing, an extension sleeve secured to said housing and surrounding said first shaft, a clutch collar surrounding said extension sleeve, said clutch collar being slidable axially on said sleeve, but fixed circumferentially thereon, a rotatable clutch plate having tapered dog teeth affixed to said first shaft, a stationary brake plate having tapered dog teeth, means securing said stationary brake plate to said casing, said clutch collar having sets of tapered dog teeth engageable selectively with the dog teeth on said clutch and brake plates, said dog teeth being tapered axially of the transmission to facilitate engagement.

2. In a mechanical transmission, a casing having therein a first shaft and a second shaft, one of said shafts being a drive shaft and the other a driven shaft, a differential comprising a housing, pinion gears and side gears, one of said side gears being attached to said first shaft, the other side gear being attached to said second shaft, an extension sleeve secured to said housing and surrounding said first shaft, a clutch collar surrounding said extension sleeve, said clutch collar being slidable axially on said sleeve, but fixed circumferentially thereon, a rotatable clutch plate on said first shaft, a stationary brake plate secured to said casing, teeth on said clutch and brake plates, said clutch collar having sets of teeth engageable selectively with the teeth on said clutch and brake plates.

3. In a mechanical transmission, a casing having therein a drive shaft, a driven shaft, a differential comprising a housing, pinion gears and side gears, one of said side gears being attached to the drive shaft, the other side gear being attached to the driven shaft, said housing having an extension sleeve surrounding said drive shaft, a clutch collar slidably keyed on said extension sleeve, a rotatable clutch plate on said drive shaft, a stationary brake plate secured to said casing, teeth on said clutch and brake plates, said clutch collar having sets of clutch teeth engageable selectively with the teeth on said clutch and brake plates, said casing comprising a body and detachable heads, an anti-friction bearing between said drive shaft and the head through which it passes, an anti-friction bearing between said driven shaft and the head through which it passes, anti-friction bearings between said differential housing and the adjacent head on the one hand and said stationary brake plate on the other hand, anti-friction bearings between said drive and driven shafts, respectively, and said differential housing, and an anti-friction bearing between said extension sleeve and said drive shaft.

4. In a mechanical transmission, a casing having therein a drive shaft, a driven shaft, a differential comprising a housing, pinion gears and side gears, one of said side gears being attached to the drive shaft, the other side gear being attached to the driven shaft, said housing having an extension sleeve surrounding said drive shaft, a clutch collar slidably mounted on said extension sleeve and rotatable therewith, a rotatable clutch plate having tapered dog teeth on said drive shaft, a stationary brake plate secured to said casing and having tapered dog teeth, said clutch collar having sets of tapered dog teeth engageable selectively with the dog teeth on said clutch and brake plates, said casing comprising detachable heads, bearings between one of said heads and said stationary brake plate on the one hand and said differential housing on the other hand.

5. In a transmission, a housing comprising a pair of spiders and a pair of plates, said plates having interfitting seating relation with each other, said spiders having peripheral seating relation with said plates and having hub portions, said plates having through recesses and complementary seats on opposite sides of said recesses, stub shafts in said seats, pinions located in said recesses and journalled on said stub shafts, a set of side shafts, external bearings for said shafts located axially of said hubs, a bearing between each plate and its respective side shaft, side gears keyed to said side shaft meshing said pinions and clearing said hubs, and clamping bolts clamping said spiders and plates together.

6. In a transmission, a casing, a housing comprising spiders and plates, said plates and spiders being clamped together, said spiders having hub portions journalled in said casing, pinions, means supported by said spiders and by said plates for rotatably mounting said pinions, side gears meshing said pinions, and means supported in part by said plates for rotatably mounting said side gears.

7. In a transmission, a casing comprising a body and first and second detachable heads, a brake plate secured to said body intermediate said heads, a differential comprising a housing journalled between said first head and said plate, a first shaft journalled in said first head and in said housing, a second shaft journalled in said second head and in said housing, a rotatable clutch element carried by said second shaft, a movable clutch element carried by said housing, a stationary brake element carried by said plate, means for causing selective engagement of said movable clutch element with said rotatable clutch element and said brake element.

8. In a mechanical transmission, a casing having therein a first shaft and a second shaft, one of said shafts being a drive shaft and the other a driven shaft, a planetary assembly comprising a rotary support, a planet gear journalled on said support, a sun gear driving said planet gear and being attached to said first shaft, a second sun gear driven by said planet gear and being attached to said second shaft, an extension sleeve secured to said rotary support and surrounding said first shaft, a clutch collar surrounding said extension sleeve, said clutch collar being slidable axially on said sleeve, but fixed circumferentially thereof, a rotatable clutch plate on said first shaft, a stationary brake plate secured to said casing, said clutch collar being engageable selectively with said brake and clutch plates.

9. In a mechanical transmission, a casing having therein a first shaft and a second shaft, one of said shafts being a drive shaft and the other a driven shaft, a planetary assembly comprising a rotary support having hubs, bearings between said hubs and said casing, a planet gear journalled on said support, a sun gear driving said planet gear and being attached to said first shaft, a second sun gear driven by said planet gear and being attached to said second shaft, said rotary support including an extension sleeve surrounding said first shaft, bearings between said rotary support and said shafts, a clutch collar surrounding said extension sleeve, said clutch collar being slidable axially on said sleeve, but fixed circumferentially thereof, a rotatable clutch plate on said first shaft, a stationary brake plate secured to said casing, said clutch collar being engageable selectively with said clutch and brake plates.

WILLIAM H. JOHNSON.